United States Patent [19]
Hamada et al.

[11] Patent Number: 4,992,959
[45] Date of Patent: Feb. 12, 1991

[54] METHOD AND APPARATUS FOR ROTATING CHARACTER ARRAY IMAGE

[75] Inventors: Akira Hamada, Osaka; Yasuji Obuchi; Hirokatsu Akiyama, both of Nara; Yasuhisa Nakamura, Kyoto, all of Japan

[73] Assignee: Sharp Kabushiki Kaisha, Osaka, Japan

[21] Appl. No.: 449,088

[22] Filed: Dec. 8, 1989

Related U.S. Application Data

[63] Continuation of Ser. No. 203,467, Jun. 7, 1988, abandoned.

[30] Foreign Application Priority Data

Jun. 8, 1987 [JP] Japan ................................. 62-142679

[51] Int. Cl.⁵ .............................................. G06F 15/62
[52] U.S. Cl. ................................................... 364/519
[58] Field of Search ............... 364/518, 519, 443, 444; 340/727

[56] References Cited

U.S. PATENT DOCUMENTS

| 4,271,476 | 6/1981 | Lotspiech | 340/727 X |
| 4,566,002 | 1/1986 | Miura et al. | 340/727 |
| 4,703,515 | 10/1987 | Baroody, Jr. | 340/727 X |
| 4,837,845 | 6/1989 | Pruett et al. | 340/727 X |

Primary Examiner—Dale M. Shaw
Assistant Examiner—Mark K. Zimmerman
Attorney, Agent, or Firm—Flehr, Hohbach, Test, Albritton & Herbert

[57] ABSTRACT

A word processor with capability of printing characters in rotated orientations as well as in the normal upright orientation is so programmed that characters appearing inside a specified reference area on its display device can be printed not only in a rotated orientation but also at a new position which is symmetric from its original position such that a character arrangement, for example, for describing a seating arrangement as seen in one direction can be automatically converted into another character arrangement corresponding to the same seating arrangement but as seen in another direction.

8 Claims, 3 Drawing Sheets

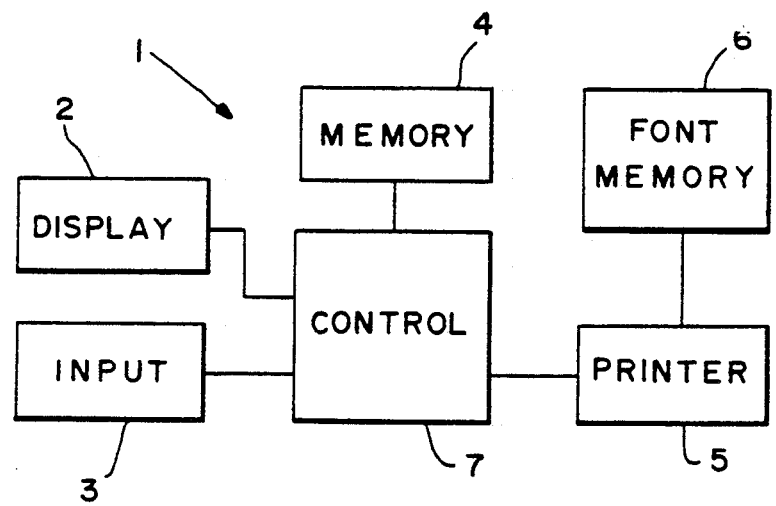
FIG.—1
FIG.—3
FIG.—4
FIG.—5

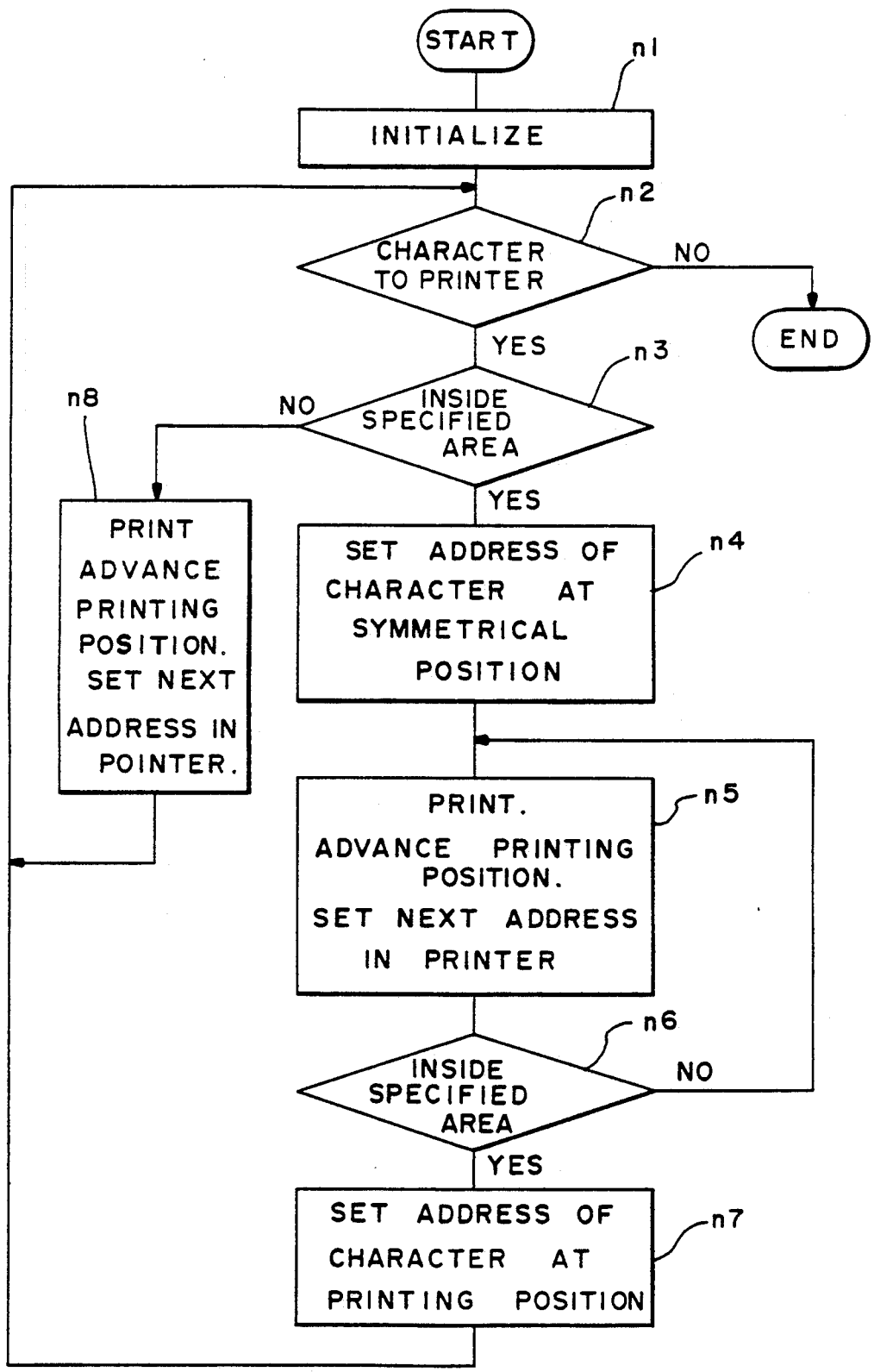
FIG.—2

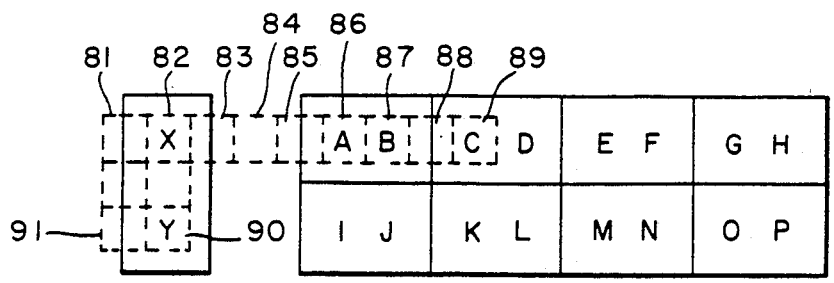
FIG.-8
FIG.-9
FIG.-6A  FIG.-6C
FIG.-6B  FIG.-6D
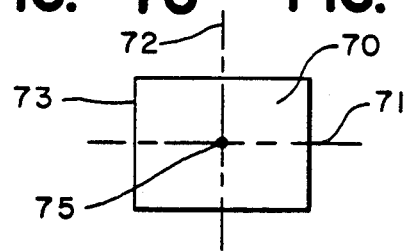
FIG.-7A  FIG.-7B
FIG.-7C  FIG.-7D
FIG.-10
FIG.-7E

METHOD AND APPARATUS FOR ROTATING CHARACTER ARRAY IMAGE

This is a continuation of application Ser. No. 203,467 which was filed June 7, 1988 and now abandoned.

BACKGROUND OF THE INVENTION

This invention relates to a word processor capable of printing characters in rotated orientations and a method of printing by such a word processor.

In a business office or the like where many people work together, desks individually assigned to them are frequently arranged in fact-to-face relationships. Since most Japanese names consist of two kanji-characters, a table for showing the seating arrangement of persons in such an office where desks are arranged in two rows with the supervisor's desk facing the group members may typically look as shown in FIG. 8 except alphabetic letters are used therein instead of kanji-characters for the convenience of readers who may not be able to recognize or identify kanji-characters. This table, however, is of the seating arrangement as seen in the direction in which four of the members IJ, KL, MN and OP are seated. Thus, although this table is conveniently drawn for these four persons, it is not easy for the others to use. For AB, CD, EF and GH, another table shown in FIG. 9 would be preferred. For the same reason, the supervisor named XY at the head of the two rows of desks would prefer still another table shown in FIG. 10. If a conventional Japanese language word processor is used to print out all these tables, it is necessary to prepare new sets of input data separately although they all correspond to the same seating arrangement and although most modern Japanese language word processors are capable of printing individual characters upside down or in otherwise rotated orientations.

SUMMARY OF THE INVENTION

It is therefore an object of the present invention to provide a method of using a word processor of the type capable of printing individual characters upside down or in otherwise rotated orientations to efficiently print out tables of positions as seen in different directions and a word processor with which such a method can be utilized.

A word processor with which the above and other objects can be achieved is assumed to have the function of printing characters in rotated orientations by 90°, 180° and 270° with its control units so programmed that characters found inside one of specified areas partitioned on its display device are printed not only in a rotate orientation but also at positions which are symmetrically opposite from the original position within the same partitioned area, depending on what kind of conversion is desired to print out a different character arrangement based on the original one being displayed. With such a word processor, tables, for example, of a seating arrangement seen in different directions can be printed out without preparing a separate set of data for each table.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a block diagram of a word processor embodying the present invention,

FIG. 2 is a flow chart for the printing operation embodying the present invention, FIGS. 3-5 are examples of tables printed by the method embodying the present invention, FIGS. 6A-6D are drawings of four different orientations in which a character can be printed, FIGS. 7A-7E are drawings showing the conversions of a character arrangement according to the present invention, and FIGS. 8-10 are desired tables showing a seating arrangement as seen in different directions.

DETAILED DESCRIPTION OF THE INVENTION

In FIG. 1 which is a block diagram for showing the basic structure of a word processor 1 embodying the present invention, numeral 2 indicates a display device, numeral 3 indicates an input device, numeral 4 indicates a temporary memory device for storing document data or the like, numeral 5 indicates a character printing device, numeral 6 indicates a font memory device connected to the printing device 5 and numeral 7 indicates a control unit. The control unit 7 not only controls the other components such as the display device 2, the input device 3, the memory device 4 and the printing device 5 but also performs various word processing functions such as kana-kanji conversion in the case of a Japanese language word processor. The printing device 5 is capable of printing characters stored in the font memory device 6 not only in the normal upright position as shown in FIG. 6A in the case of the letter "A" for example but also in different rotated orientations as shown in FIGS. 6B (90°-rotated orientation), 6C (180°-rotated orientation) and 6D (270°-rotated orientation).

Conversions of character arrangement which are performable by a word processor embodying the present invention are explained next by way of FIGS. 7A-7E. In FIG. 7E, numeral 70 indicates a rectangular region delineated by boundary lines 73, numerals 71 and 72 indicate its two axes of symmetry each of which serves as a reference of conversion and numeral 75 indicates its center of rotational symmetry or its center of gravity at which the aforementioned two axes of symmetry 71 and 72 cross each other at 90°. Let us consider an illustrative example where six characters A-F are arranged in the area 70 as shown in FIG. 7A. If each pair of characters at mutually symmetrical positions with respect to the center point 75 is interchanged, a new arrangement as shown in FIG. 7B is obtained. For convenience, such a conversion is hereinafter referred to as a conversion of the first kind. If each pair of characters at mutually symmetrical positions with respect to the line 72 (or 71) is interchanged, a new arrangement as shown in FIG. 7C (or 7D) is obtained. Similarly, such a conversion is hereinafter referred to as a conversion of the second (or third) kind.

Let us assume next that the table of seating arrangement shown in FIG. 8 is already stored as document data in the memory device 4. If a conversion of the first kind is performed inside each of the rectangular areas of FIG. 8 containing the name of the person assigned to it and the characters are thereafter printed in the upside down orientation (or in the 180°-rotated orientation), a new table shown in FIG. 3 is obtained. The table thus obtained and shown in FIG. 3 is convenient when the original table in FIG. 8 is viewed in the upside down direction, that is, for use by AB, CD, EF and GH. In fact, the table shown in FIG. 3 is an equivalent of that shown in FIG. 9.

If a conversion of the second kind is performed with respect to each rectangular area of FIG. 8 and the characters at their converted positions are printed in their 270°-rotated orientations, a new table as shown in FIG. 4 is obtained. This table is convenient when the original table in FIG. 8 is viewed from the position of the supervisor XY and is an equivalent of FIG. 10. Similarly, if a conversion of the third kind is performed with respect to each rectangular area of FIG. 8 and the characters at their converted positions are printed in their 90°-rotated orientations, a new table as shown in FIG. 5 is obtained. This corresponds to the view of the seating arrangement taken in the direction towards the supervisor XY.

Next, a program for the control unit 7 according to which converted tables of the types shown in FIGS. 3, 4 and 5 can be printed from the original document data corresponding to the table shown in FIG. 8 is explained by way of the flow chart in FIG. 2. Although not shown in FIG. 1, the control unit 7 includes a pointer for setting therein an address. The address set in the pointer indicates which of the characters stored in the memory device 4 is to be printed next, or when the printing device 5 receives a print signal next from the control unit 7. At the beginning of the printing program, the pointer is initialized (n1) and the printing position normally moves thereafter from the left to the right along each line. If there is no character to be printed at the first printing position (NO in Step n2), no print signal is transmitted and the next printing position to the right is considered as mentioned above. If there is any character to be printed (YES in Step n2), it is examined whether or not this character is completely inside one of the rectangular areas of the type shown at 70 in FIG. 7E predelineated by boundary lines 73 inside which a conversion of character arrangement is to be effected (n3). If this printing position is not totally inside one of these prespecified areas (NO in Step n3), the character at the address is printed in the normal upright orientation and after the next address is set in the pointer, the program returns to Step n2 to consider the next printing position (n8). The desired type of conversion of character arrangement is assumed to be already specified such as the conversion of the first, second or third kind. If the printing position is found to be completely inside one of the specified rectangular areas (YES in Step n3), the address in the memory device 4 of the character located symmetrically with respect to the current printing position is set in the pointer according to the selected kind of conversion (n4) and after the character at the address thus set is printed in an appropriately rotated orientation corresponding to the selected kind of conversion, the next printing position is considered and the next address in the direction dependent on the selected type of conversion is set in the pointer (n5).

If this new printing position is not outside the specified area, or if it is still inside the same specified rectangular area with respect to which the conversion is being effected (NO in Step n6), the program returns to Step n5 and this loop is repeated until the printing position to be considered is no longer completely within the same specified area (YES in Step n6). When this takes place, the address in the memory device 4 corresponding to the current printing position is set in the pointer (n7) and the program returns to Step n2.

Next, the operation according to the flow chart of FIG. 2 is further explained in detail by way of an example. In particular, let us assume that document data corresponding to the character arrangement in the table shown in FIG. 8 are already stored in the memory device 4 and that it is desired to print a converted character arrangement of the table shown in FIG. 3.

As explained above, the printing position moves from the left to the right and when it reaches the position indicated by numeral 81 in FIG. 8, the program recognizes that there is something to be printed but that this position is not completely inside one of the specified rectangular area delineated by boundary lines. With reference to FIG. 2, therefore, the program proceeds from Step n2 through Step n3 to Step n8 and after a ruled line is printed, the next printing position at numeral 82 is considered. Since this new printing position 82 is completely within one of the specified areas, the program proceeds this time from Step n3 to Step n4 where the address of the character at the symmetric position is set in the pointer. Since the conversion of the first kind inside each specified area is desired in this example, the character at the position symmetric to the current printing position 82 is Y at the position indicated by numeral 90. It is therefore the address of this character that is set in the pointer and the character Y is printed at the current printing position 82 in the upside down (180°-rotated) orientation (n5). This is how the character Y is printed in the way shown in FIG. 3. Thereafter still in Step n5, the address next to that currently contained in the pointer is set in the pointer and the printing position is advanced to the next position 83. Because it is a conversion of the first kind, the new address to be set in the pointer in this step is the one corresponding to the position 91 symmetrically opposite from this new printing position 83 and since this new printing position 83 is no longer completely inside the specified rectangular area, the program returns from Step n6 to Step n2 and proceeds through Step n3 to Step n8 where a ruled line is printed.

The printing position is further advanced (n8), this time, to the position 84. Since this is outside any of the specified areas, the program branches from Step n3 to Step n8 and prints a blank character before returning to Step n2. The next printing position 85, like the position 81 discussed above, has a ruled line and is not inside a specified area and hence a ruled line is printed at this printing position.

When the position 86 is considered, the program goes from Step n3 to Step n4 because it is inside a specified area. Since the character at the position symmetrically opposite (that is, the position 87) is B, this is the character which is printed in the upside down orientation at this printing position 86 (n5). Thereafter still in Step n5, the printing position is advanced to the next position 87 and the address then set in the pointer is changed to the next one, that is, the address corresponding to the character A. In Step n6, since the new printing position 87 is still inside the same specified area, Step n5 is repeated and the character A the address of which is now in the pointer is similarly printed in the upside down orientation. Thereafter, the printing position is shifted to the position 88 and the address in the pointer is further changed to that corresponding to the position 85, but since this new printing position 88 is no longer inside a specified area, (YES in Step n6), the program goes from Step n6 through Step n7 back to Step n2 and a ruled line is printed in Step n8. Thereafter, the printing position moves to the position 89 and a table shown in FIG. 3 continues to be printed.

In order to obtain the table shown in FIG. 4 from the same document data in the memory device 4 corresponding to the character arrangement shown in FIG. 8, the program is modified in Step n4 such that the address of the character at the position symmetrically opposite with respect to the line 72 of FIG. 7E will be set in the pointer and printing is effected in the 270°-rotated orientation. Since the characters X and Y are on the line of symmetry 72 in this case, their own addresses are set in the position and there is no change in the character arrangement.

In order to obtain the table shown in FIG. 5 from the same document data in the memory device 4 corresponding to the character arrangement shown in FIG. 8, the program is modified again in Step n4 such that the address of the character at the position symmetrically opposite with respect to the line 71 of FIG. 7E will be set in the pointer and printing is effected in the 90°-rotated orientation. In this case, only the characters X and Y change in character arrangement because all the other characters are on the line of symmetry of their corresponding areas.

In summary, the present invention makes it unnecessary to prepare four separate sets of input data to print out tables as shown in FIGS. 3, 4, 5 and 8 relating to a same seating arrangement but seen in four different directions. The foregoing description of a preferred embodiment of the invention has been presented for purposes of illustration and description. It is not intended to be exhaustive or to limit the invention to the precise form disclosed, and many modifications and variations are possible in light of the above teaching. In particular, it should be remembered regarding the figures that the characters A-P, X and Y were used to represent kanji-characters and are to be so interpreted. With a word processor capable of printing each character in rotated orientations by 90°, 180° and 270° in addition to the normal upright orientation, however, the present invention is applicable to the production of similar character arrangements seen in different directions also in English. It should also be noted that names with only one kanji-character as well as names with three or more kanji-characters can be handled by the same program illustrated above. Any modifications and variations that may be apparent to a person skilled in the art are intended to be included within the scope of this invention.

What is claimed is:

1. A method of printing by a word processor having a display device with a display area and a font memory storing a character font and being capable of causing said character font to be printed in rotated orientations, said method comprising the steps of
    defining a plurality of quadrangular areas on said display area, each of said quadrangular areas having symmetry axes and a symmetry point associated therewith and containing therein an initial character array of one or more characters in a first orientation,
    specifying an angle,
    identifying individual characters displayed at initial positions inside each one of said quadrangular areas, and
    causing said identified characters to be printed in a second orientation at target positions, said second orientation being rotated from said first orientation by said specified angle, said target positions being in a symmetrical relationship with said initial positions with respect to one of said symmetry axes or said symmetry point associated with a corresponding one of said quadrangular areas according to said specified angle such that said printed characters in said target positions within each of said quadrangular areas form a new character array which may be rotated from but reads the same, when seen in said second orientation, as the initial character array in the same one of said quadrangular areas.

2. The method of claim 1 wherein said angle can be specified as 90, 180 and 270 degrees.

3. The method of claim 1 wherein said new character array as seen in said second orientation is rotated by a right angle if said specified angle is 90 degrees or 270 degrees.

4. The method of claim 1 wherein said new character array as seen in said second orientation is in the same direction as said initial character array as seen in said first orientation if said specified angle is 180 degrees.

5. A word processor comprising
    a display device with a display area,
    a font memory storing a character font,
    a printer means connected to said font memory and capable of printing said character font in rotated orientations as well as in normal upright orientation, and
    control means connected to said display device and said printing means and capable of
    identifying individual characters of initial character arrays displayed on said display area and contained in a plurality of quadrangular areas defined on said display area of said display device, each of said quadrangular areas having symmetry axes and a symmetry point associated therewith, each of said individual characters being displayed in a first orientation at an initial position inside one of said quadrangular areas, and
    causing said identified characters to be printed by said printer means in a second orientation at target positions, said second orientation being rotated from said first orientation by a specified angle, said target positions being in a symmetrical relationship with said initial positions with respect to one of said symmetry axes or said symmetry point associated with a corresponding one of said quadrangular areas according to said specified angle such that said printed characters in said target positions within each of said quadrangular areas form a new character array which may be rotated from but reads the same, when seen in said second orientation, as the initial character array in the same one of said quadrangular areas.

6. The word processor of claim 5 wherein said angle can be specified as 90, 180 and 270 degrees.

7. The word processor of claim 5 wherein said new character array as seen in said second orientation is rotated by a right angle is said specified angle is 90 degrees or 270 degrees.

8. The word processor of claim 5 wherein said new character array as seen in said second orientation is in the same direction as said initial character array as seen in said first orientation if said specified angle is 180 degrees.

* * * * *